Feb. 9, 1926.
E. HEITMAN ET AL
BEARING CAP
Filed August 23, 1921
1,572,287
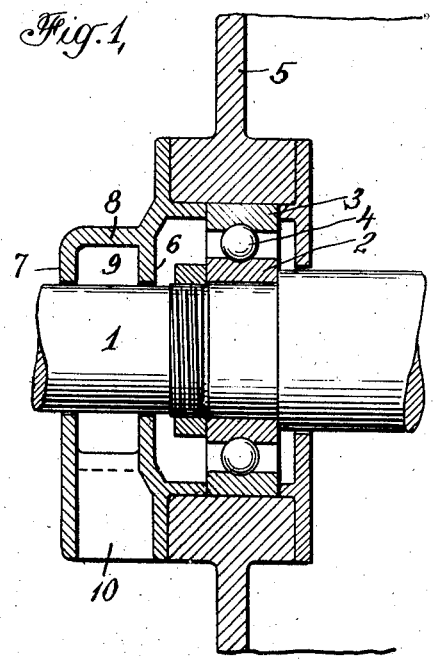
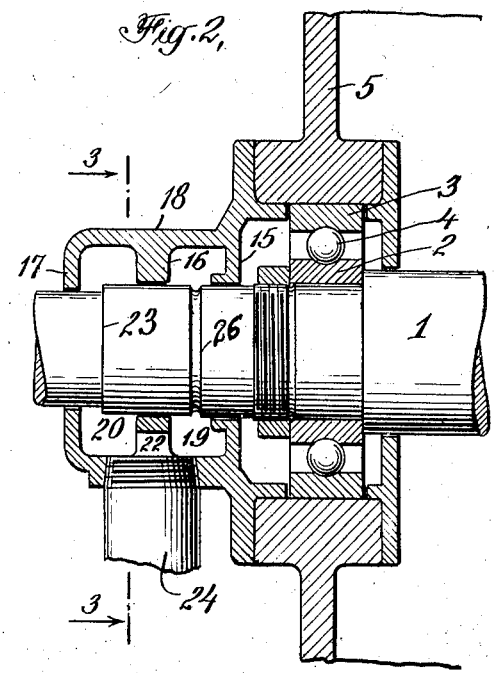
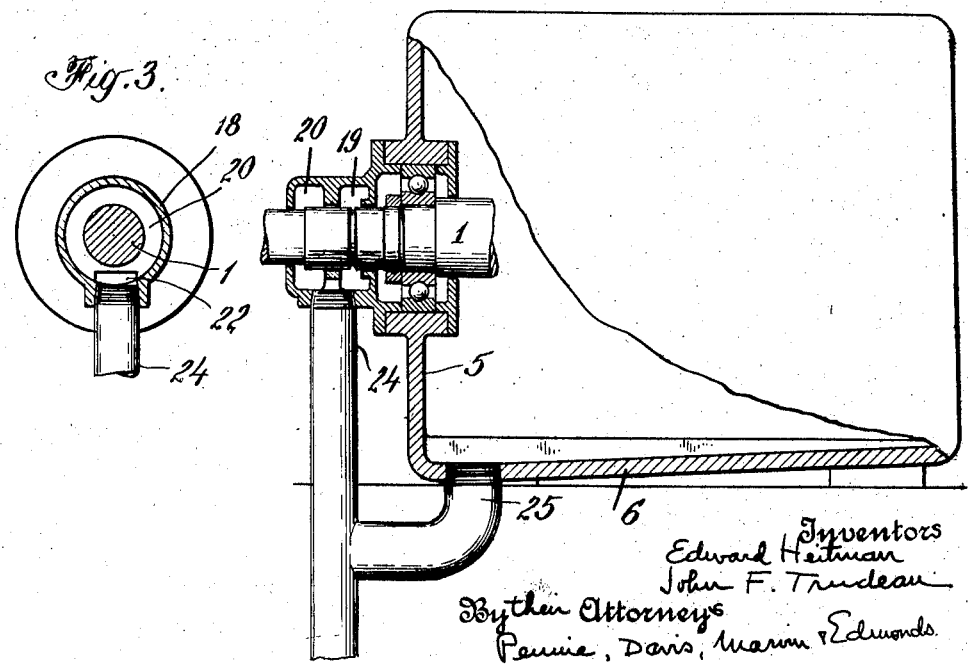
Inventors
Edward Heitman
John F. Trudeau
By their Attorneys
Pennie, Davis, Marvin & Edmonds.

Patented Feb. 9, 1926.

1,572,287

UNITED STATES PATENT OFFICE.

EDWARD HEITMAN, OF JERSEY CITY, AND JOHN F. TRUDEAU, OF BAYONNE, NEW JERSEY, ASSIGNORS TO ELECTRO DYNAMIC COMPANY, OF BAYONNE, NEW JERSEY, A CORPORATION OF NEW JERSEY.

BEARING CAP.

Application filed August 23, 1921. Serial No. 494,619.

*To all whom it may concern:*

Be it known that we, EDWARD HEITMAN, a resident of Jersey City, State of New Jersey, and JOHN F. TRUDEAU, a resident of Bayonne, State of New Jersey, have invented certain new and useful Improvements in Bearing Caps; and we do hereby declare the following to be a full, clear, and exact description of the invention, such as will enable others skilled in the art to which it appertains to make and use the same.

This invention relates to bearing caps for protecting bearings against the entrance of water and has for its object the provision of an improved water excluding bearing cap.

It is not infrequently necessary to operate the bearings or journals of various kinds of machinery in damp or wet places where they are exposed to a greater or less extent to splash water such, for example, as spray or rain. When the machinery is operated in places where its parts are exposed to splash water the water collects upon the rotating shafts, is worked along the shaft by its rotation and then tends to enter the various bearings which are provided for the support of the shaft. Again, in certain other instances, it is necessary or desirable to operate machinery under conditions where certain of its bearings and the shafts passing through them are more or less completely submerged in water. In such cases the pressure, or head, of the water tends to force it into the bearings. An electric motor is an example of one particular kind of apparatus which is sometimes operated with its bearings exposed to splash water, or entirely submerged in water. The improved bearing cap has been extensively employed on shipboard for the bearings of winch motors which are located on deck and frequently exposed to waves washing over the rail. In rough weather these motors are not infrequently submerged, by such waves for periods ranging from a few seconds to several minutes, the submerging recurring at frequent intervals for hours at a time.

It is of great importance to the successful operation of such bearings that this water which tends to find its way into them be effectively excluded. It interferes with the lubrication of the bearings and if it enters in sufficient quantity drives out the greater part of the lubricant from between the bearing surfaces. The water may also work completely through a bearing and reach the inside of the casing of the machine and damage the appartus contained within this casing. As an illustration, in the case of an electric motor, if water gets into the casing and comes in contact with the windings or commutator it may, sooner or later, seriously damage the entire machine.

We have found that water can be very effectively excluded from bearings by providing the bearings with a water-excluding cap, recessed to form with the shaft one or more annular chambers having end walls which closely surround, but are slightly spaced from, the shaft, and having means providing an unrestricted flow of drainage from the chambers. When the shaft is exposed to the action of splash water, such as spray or rain, the closely spaced end walls serve to pick up the drops of water forming on the shaft and carry them away from the shaft and thus prevent the entrance of water into the bearing. This action is substantially the same whether the shaft is stationary or rotating, but when the shaft is rotating the centrifugal effect assists in throwing the drops of water from the shaft onto the walls of the annular chamber.

When the bearing is to operate under conditions where it is to be submerged, a plurality of annular chambers (preferably two) are provided, and a water-deflecting element surrounds the shaft within the outer chamber. Also a centrifugal water-throwing device is provided on the shaft within the inner chamber. The end walls or flanges of the two chambers each closely surround but are slightly spaced from the shaft. If a bearing provided with such a water-excluding device is submerged, a relatively thin annular stream of water enters the device between the outside end wall and the shaft. This annular stream impinges against the water-deflecting element which surrounds the shaft in the path of the annular stream, and the stream is effectively deflected thereby against the walls of the outer annular chamber from which it drains through an exit which provides an unrestricted flow of the water so that there is no possibility of an accumulation of water within the annular chamber.

In the accompanying drawings we have illustrated our invention as applied to a friction reducing bearing of the ball type although the invention is, of course, also applicable to a bearing of the plain or sleeve type.

In these drawings—

Fig. 1 is a view in longitudinal section of a bearing and bearing cap in which merely a single chamber is provided.

Fig. 2 is a view in longitudinal section showing a modified form of the invention in which two chambers are provided in the bearing cap.

Fig. 3 is a cross sectional view on a reduced scale taken on line 3—3 of Fig. 2, and Fig. 4 is a view, partly in section and partly in elevation, showing a further application of our invention.

Referring to Fig. 1 of these drawings which illustrates a bearing cap having a single chamber, shaft 1 is provided with a hardened collar 2 forming a part of the ball bearing and secured on the shaft in any appropriate manner. Collar 3, between which and collar 2 the balls 4 operate in a suitable raceway provided therefor, is rigidly secured to frame 5 which may be the casing of an electric motor. Secured to the outer surface of frame 5 is the water-deflecting cap protecting the bearing and comprising an outer wall 8 having flanges 6 and 7 extending inwardly from wall 8 in the direction of shaft 1, and forming with the outer wall an annular chamber 9 surrounding the shaft. Chamber 9 is provided at the bottom with a drainage duct 10. Walls 7 and 8 of the water-deflecting cap protect the portion of shaft 1 immediately adjacent to the bearing from the action of the water so that any water that tends to enter the bearing must pass through the narrow annular space between shaft 1 and wall 7. Wall 7 is so closely spaced from the shaft that it picks up the drops of water which tends to enter here and conveys them downwardly away from the shaft. If the shaft is rotating the centrifugal effect assists in throwing water off of the shaft and onto the walls of chamber 9 from which it drains away through the drainage ducts 10.

Referring now to Figs. 2 and 3 of the drawings there is here shown a water-deflecting cap similar to the cap above described but provided with two catch chambers and intended for use where the bearing is to be submerged. In these figures shaft 1 is carried through frame 5 by means of a ball bearing as previously described. Frame 5 supports the water-deflecting cap comprising the outer wall 18 surrounding the shaft and having flanges 15, 16 and 17 extending inwardly therefrom in the direction of the shaft. The inwardly extending flanges or end walls 15, 16 and 17 together with outer wall 18 form two annular chambers 19 and 20 surrounding the shaft. Passage 22 through wall 16 at the bottom of the cap connects chambers 19 and 20 and allows these chambers to drain into the common drain pipe 24. Shaft 1 is provided with an enlargement forming a shoulder 23 disposed within the outer chamber 20 so as to act as a water-deflecting and also as a water-throwing means within this chamber. Shaft 1 is also provided with a groove which forms a second shoulder 25 within the inner chamber 19 which is adapted to function as a second water-throwing device.

When this water-deflecting cap is placed upon a bearing which is either exposed to the action of splash water or submerged, it very effectively prevents the entrance of water to the bearing. If the shaft and bearing are exposed to the action of splash water only, the water collects upon the outer left hand end of shaft 1 in drops and these gradually work along the shaft in one direction or another by its rotation and some of them will tend to enter the bearing. Those tending to enter through the annular space between the shaft and the outside end wall 17 are in large degree picked up by this wall and carried away from the shaft because of the close proximity of the wall to the shaft. This action takes place whether or not the shaft is rotating. If, however, the shaft is rotating, water which reaches the shoulder 23 is thrown off by centrifugal action and collected by annular chamber 20 from which it drains away through pipe 24. Whatever water is not removed by the cooperative action of shoulder 23 and chamber 20 either remains on the shaft or else works along the shaft towards the inner chamber 19, and upon reaching the second shoulder 26 begins to pile up and form a ring around the shaft at this point, inasmuch as the centrifugal effect of the rotation of the shaft prevents the water from flowing toward the center of the shaft across the face of shoulder 26. After the water has piled up in this ring to a certain extent, depending, among other things, upon the surface tension of the water, it is thrown off from the shaft, collected by chamber 19 and drained away through pipe 24.

In the event that the bearing is operated submerged in water the pressure or head of the water causes an annular stream to enter the water-deflecting cap between the shaft and flange 17. This water immediately strikes shoulder 23 and a large amount of it is deflected from the shaft, collected by chamber 20 and drained off through pipe 24 which is arranged to discharge in such manner as to allow free exit of any water tending to flow through the pipe. Most of the water is deflected from the shaft in this manner and the majority of the remainder is thrown off by the centrifugal effect of the rotation of the shaft. Whatever is left is collected by chamber 19 as previously described.

In the modified application of my invention illustrated in Fig. 4 means are provided for draining away any water that may succeed in getting into the motor casing, either around the shaft or in any other manner. The motor is provided with one or more two-chambered water-deflecting caps such as shown in Fig. 2. The bottom of the motor casing is made sloping as indicated at 6, preferably with its lowest point near one end of the casing as illustrated. A drain pipe 25 is connected at this lowest point and serves to carry off any water that may have obtained entrance to the motor casing. Drain pipe 25 may be led into drain 24, from the water-deflecting cap, or it may be carried separately to the place of discharge.

By the use of this water-deflecting cap of our invention, we have found that a very reliable and efficient means is provided for preventing the entrance of water to bearings with particular effectiveness and which, on account of its simplicity, may be produced at relatively low cost. In the operation of our device a minimum of power is taken from the rotating shaft by friction or other means, as there are no stuffing boxes necessary for its successful operation. The fact that our improved water-excluding device can be successfully used in many places to replace a stuffing box or gland which is provided with packing is of especial importance. A stuffing box having packing in contact with the shaft requires that the packing be properly adjusted so that the friction will not be too great and yet will be sufficient to prevent leakage. In order to maintain such a stuffing box in proper operating condition it must receive periodical attention from a skilled workman. On the other hand, our improved water-excluding device is relatively easy to install and, after installation, needs no attention whatever. For this reason it may be used with particular advantage under circumstances where the proper periodical attention is difficult to provide.

We claim:

1. In a device for excluding water from shaft bearings, a bearing cap recessed to form with the shaft an annular chamber and having an end wall closely surrounding but spaced from the shaft so as to admit a relatively thin annular stream of water into the chamber when the bearing is submerged, a water-deflecting element surrounding the shaft within said annular chamber in the path of the annular stream for acting to direct the stream away from the shaft and onto the walls of the chamber, and means for providing an unrestricted flow of said water from said annular chamber.

2. In a device for excluding water from shaft bearings, a bearing cap recessed to form with the shaft an outer annular chamber and a second annular chamber spaced inwardly thereof, said cap having an end wall closely surrounding but spaced from the shaft so as to admit a relatively thin annular stream of water into the outer chamber when the bearing is submerged, a water-deflecting element surrounding the shaft within said outer chamber in the path of the annular stream for acting to direct the stream away from the shaft and onto the walls of the outer chamber, centrifugal means on the shaft within the second chamber for throwing water tending to creep along the shaft onto the walls of this last mentioned chamber, and means for providing an unrestricted flow of water from both of said annular chambers.

3. In a device for excluding water from shaft bearings, a bearing cap recessed to form with the shaft an outer annular chamber and a second annular chamber spaced inwardly thereof, said cap having an end wall closely surrounding but spaced from the shaft so as to admit a relatively thin annular stream of water into the outer chamber when the bearing is submerged, a water-deflecting element surrounding the shaft within said outer annular chamber in the path of the annular stream for acting to direct the stream away from the shaft and onto the walls of the chamber, a wall intermediate said annular chambers closely surrounding but spaced from the shaft to pick up drops of water forming on the shaft and reduce the creepage between these chambers, a third similar wall between the second chamber and the bearing, and means providing an unrestricted flow of water from both chambers.

4. In a device for excluding water from shaft bearings, a bearing cap recessed to form with the shaft an annular chamber and having outer and inner end walls closely surrounding but spaced from the shaft and serving to pick up drops of water forming on the shaft and to convey them therefrom, and an outlet at the bottom of the chamber for discharging said water outside of the bearing.

In testimony whereof we affix our signatures.

EDWARD HEITMAN.
JOHN F. TRUDEAU.